March 16, 1954        R. H. FORGY        2,672,081
QUICK PENETRATING SUBSOILER

Filed June 22, 1950        3 Sheets-Sheet 1

*INVENTOR*
ROBERT H. FORGY

BY
*ATTORNEY*

March 16, 1954  R. H. FORGY  2,672,081
QUICK PENETRATING SUBSOILER
Filed June 22, 1950  3 Sheets-Sheet 2
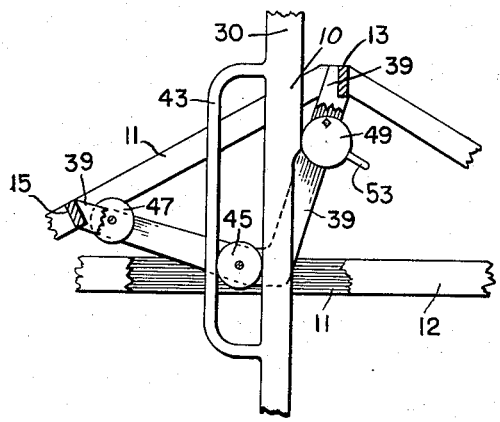
FIG. 2.
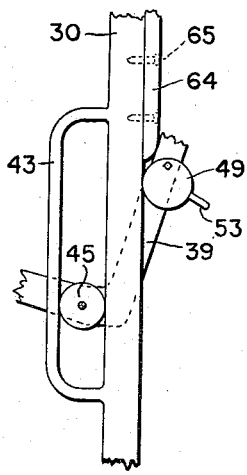
FIG. 6.
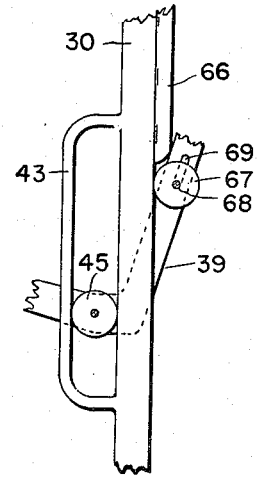
FIG. 7.
INVENTOR
ROBERT H. FORGY
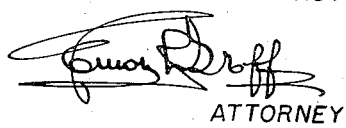
ATTORNEY March 16, 1954 R. H. FORGY 2,672,081
QUICK PENETRATING SUBSOILER
Filed June 22, 1950 3 Sheets-Sheet 3

*INVENTOR*
ROBERT H. FORGY

BY
*ATTORNEY*

Patented Mar. 16, 1954

2,672,081

UNITED STATES PATENT OFFICE 2,672,081

QUICK PENETRATING SUBSOILER

Robert H. Forgy, Centralia, Kans.

Application June 22, 1950, Serial No. 169,587

5 Claims. (Cl. 97—46.27)

This invention relates to agricultural implements and is more particularly concerned with subsoilers for breaking soil below the ground level.

One of the objects of this invention is an implement of the type mentioned which can be used for very great depths.

A specific object of the invention is the provision of a subsoiler in which the soil breaking tool is disposed at a favorable angle for quickly penetrating surface trash and root growth as it is lowered into subsoil strata, and means for forcing the tool into a normal operating plane after it has penetrated to a given depth in the soil.

Another object is an implement of the type mentioned in which the depth of operation can be adjusted over a wide range.

A further object is the provision of means for automatically lifting the soil breaking tool in and out of contact with the ground while the implement is in motion.

A still further object is the provision of an implement of the type mentioned in which the frame thereof remains at a fixed elevation with respect to the ground while the soil breaking tool is moved relative thereto.

A still further object is the provision of an implement comprising a frame structure with ground supporting means, which means may include ordinary ground wheels, a harrow, a packer, a roller or sheep's foot, etc., a hitching connection at the front and a unit carrying the subsoiler tool mounted on the frame by means of a sliding pivot connection and abutment means for limiting the operative position of the unit relative to the frame in combination with means for moving the unit in and out of operative position in relation to the sliding pivot connection.

Other objects and advantages will appear hereinafter.

In the drawing:

Figure 2 is a section along the line 2—2 of Figure 1;

Figures 6 and 7 are fragmentary side elevational views of a portion of the implement showing certain modifications thereof.

Figure 1:
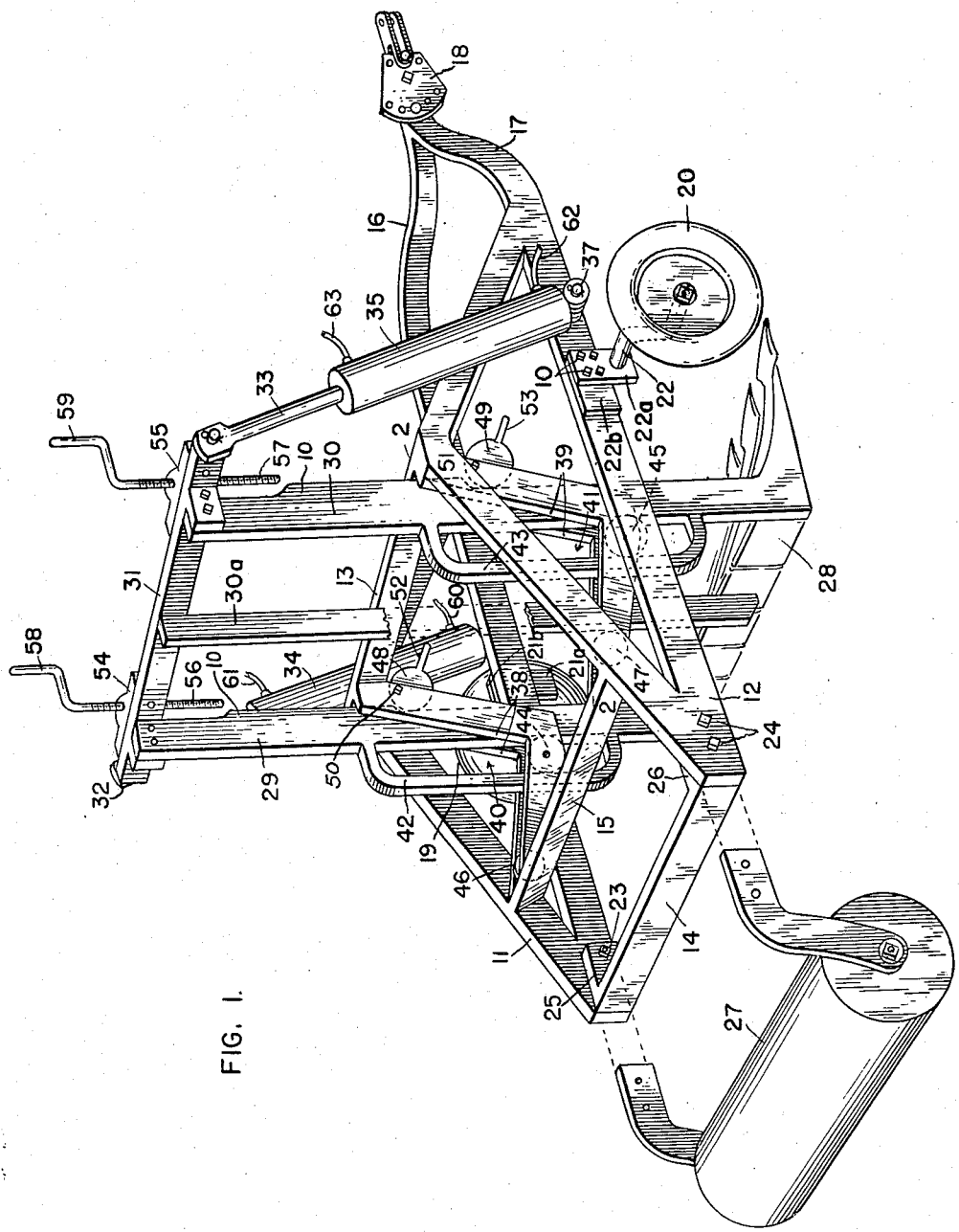
Figure 1 is an isometric view of an embodiment of the invention.

Referring with more particularity to the drawing in which like numerals designate like parts, the embodiment illustrated in Figures 1 to 5 comprises a frame structure composed of spaced triangular trusses 11 and 12 connected together by suitable cross beams including top cross beam 13, a removable cross beam 14 at the rear and an intermediate cross beam 15 between the beams 13 and 14. Additional cross beams may be provided at the front or at any other suitable points to increase the rigidity of the frame structure.

The base of the trusses 11 and 12 is provided with forwardly converging extensions 16 and 17 forming a draw-yoke to which an adjustable hitching link 18 is attached.

The frame is normally supported over the ground by means of a pair of ground wheels 19 and 20 carried on stub axles 21 and 22 which are positioned somewhat forward of the transverse center of the frame. The stub-axles are butt welded to removable plates 21a and 22a which, in turn, are secured by bolts 10 to fixed plates 21b and 22b welded to the sides of the trusses. The bolt holes in the plates are spaced equidistantly, such as in the pattern of a square, to permit securing the removable plates in different rotative positions on the fixed plates. The stub shafts are eccentrically mounted relative to the bolt holes, thereby permitting a variation in their vertical and horizontal positioning relative to the frame.

The rear cross beam 14 is U-shaped and is removably secured to the trusses by bolts 23 and 24 passing through the outer arms 25 and 26 of the beam or by any other suitable device. By these means there may be substituted for the ground wheels other ground supporting units at the rear of the frame and which may, in addition to a ground supporting function, be effective for other purposes such as packing, harrowing, and so forth. The unit 27, illustrated in Figure 1, is a typical packer.

The movable unit carrying the subsoiler tool 28 comprises a pair of parallel beams 29 and 30 which project upwardly from either side of the subsoiler tool on the inside of the trusses 11 and 12. A cross bar 31 is secured across the top of the beams 29 and 30 and the ends of the cross bar are pin-connected to the outer ends of piston rods 32 and 33 of hydraulic cylinders 34 and 35. The said cylinders at their opposite ends are pivotally connected to stub shafts 36 and 37 projecting outwardly from the sides of the trusses 11 and 12 substantially as shown. When the subsoiler tool is too wide to be supported solely by end beams 29 and 30, one or more intermediate beams, such as the beam 30a may be added to the movable unit.

The beams 29 and 30 are held between pairs of V-shaped struts 38, 38 and 39, 39, respectively secured between the cross bars 13 and 15. Each pair of struts provides a slideway for its corresponding beam disposed therebetween, as shown. Each beam 29 and 30 is provided with a longitudinal slot 40 and 41, respectively. Said slots may be formed by U-shaped bars 42 and 43 secured to the backs of the beams or formed integral therewith, substantially as shown.

Figure 3:
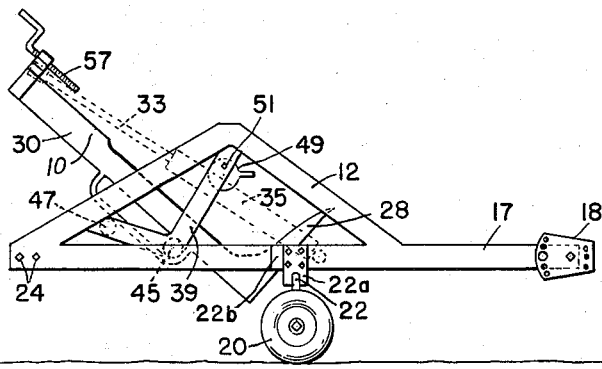
Figures 3, 4 and 5 are side elevational views of the same embodiment with the subsoiler tool in different positions.
Figure 4:
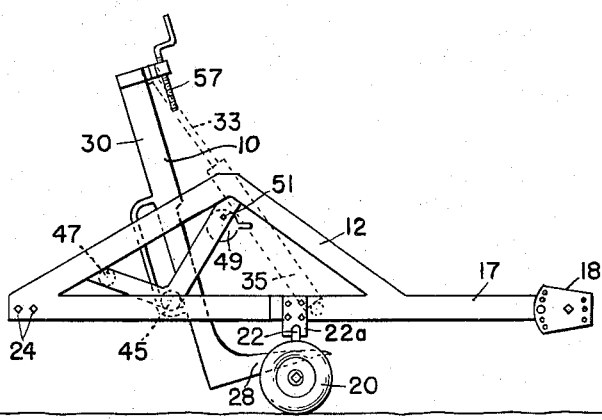

Rollers 44 and 45 are disposed in the slots 40 and 41, respectively, between the struts to which they are rotatably secured near the apex of the struts. Rollers 46 and 47 are also disposed between the struts at the rear thereof which act as abutment supports for the back of the bars 42 and 43 when the beams 29 and 30 are in position as shown in Figure 3.

Additional abutments in the form of eccentric discs or cams 48 and 49 are disposed between the struts at the forward ends thereof. Said cams are mounted on bolts 50 and 51 and are held in adjusted positions of rotation by tightening said bolts. Adjustment of the cams is effected by the loosening of the bolts and turning the cams to their desired positions by means of the radial handle bars 52 and 53. By these means the extreme forward position of the upper ends of the beams 29 and 30 can be changed within the throw limits of the said cams.

The beams 29 and 30, at their upper ends, are each provided with a forwardly thickened portion 10 having a tapered bottom to ride over cam 49, presented as an offset member for the purpose of forcing the subsoiler tool into a normal operating plane after it has penetrated to a given depth in the soil, say 4 or 5 inches. This arrangement permits the subsoiler tool to go down quickly through surface trash and root growth and prevents clogging thereof.

The cross bar 31 is provided with bosses 54 and 55 which carry abutment screws 56 and 57. The lower ends of said screws are adapted to contact the top of the cross beam 13 when the movable unit is in its operating position. See Figure 5. Said screws are provided with cranks 58 and 59 to facilitate changing their positions on the cross bar 31 and hence to change the depth of operation of the subsoiler tool 28.

Movement of the subsoiler unit is effected by means of the hydraulic cylinders 34 and 35 connected to the usual control means (not shown) through hydraulic cables 60, 61 and 62, 63. In the position shown in Figure 3, the subsoiler tool 28 is out of operating position above the ground level, hydraulic pressure being applied through the bottom cables 60 and 62 to force outwardly the piston rods 32 and 33.

Figure 5:
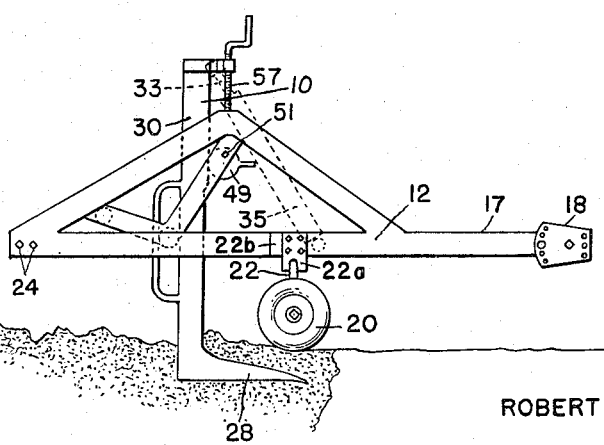

To move the subsoiler into operative position hydraulic pressure is applied to the cylinders through the upper cables 61 and 63 to retract the piston rods 32 and 33. From the position shown in Figure 3, the effect of this action is first to cause the beams 29 and 30 to pivot about the rollers 44 and 45 (see Fig. 4) until they abut the cams 48 and 49. Continued movement causes the beams 29 and 30 to move downwardly until the bottom of the screws 56 and 57 abut the top of the cross bar 13 as shown in Figure 5. The depth of operation of the subsoiler tool 28 can therefore be adjusted by means of said screws 56 and 57.

In Figure 6, the modification comprises substituting for the enlarged portion 10 a separate offset member 64, one for each of the beams 29 and 30 secured to the beam by means of countersunk bolts 65. This arrangement permits the member 64 to be removable, if its use is not needed in any particular case.

In Figure 7, the offset member 66 is welded to the beam. In each case the offset member may be slightly tapered throughout its length to compensate for any spring in the beams or subsoiler tool at extreme operating depths.

A further modification is also shown in Figure 7 in which a roller 67 is substituted for the cam 49. The roller is mounted on a shaft 68 carried in longitudinal slots 69 on the arms of the struts 39, means being provided to secure the roller shaft in different positions in the slot.

I claim:

1. A subsoiler comprising a frame structure formed by a pair of spaced triangular trusses secured together with cross beams at the top and bottom, a unit having a subsoiler tool at the bottom and arms extending upwardly therefrom between said trusses, said arms having longitudinal slots, rollers on said frame engaging said slots, hydraulic cylinders between the upper ends of said arms and the frame, abutments on the frame forward of the arms for limiting the forward angular position of said arms about said rollers, and an offset member carried on the upper portion of the forward side of said arms for engaging said abutments and thereby tipping the upper portion of the arms rearwardly when the subsoiler tool descends to a predetermined depth below the frame.

2. A subsoiler comprising a frame structure, a unit mounted on the frame structure having a subsoiler tool at the bottom and an arm extending upwardly therefrom, a roller carried by the frame engaging the rearward side of said arm, a hydraulic cylinder between the upper end of the said arm and the frame, an abutment on the frame forward of the arm for limiting the forward angular position of said arm relative to said roller, and an offset member carried on the upper portion of the forward side of said arm for engaging said abutment and thereby tipping the upper portion of the arm rearwardly when the subsoiler tool descends to a predetermined depth below the frame.

3. A subsoiler as defined by claim 2 in which the offset member is removable.

4. A subsoiler comprising a frame structure, a unit mounted on the frame structure having a subsoiler tool at the bottom and an arm extending upwardly therefrom, a roller carried by the frame engaging the rearward side of said arm, a hydraulic cylinder between the upper end of the said arm and the frame, an abutment on the frame forward of the arm for limiting the forward angular position of said arm relative to said roller, said abutment being adjustable on the frame relative to the arm, and an offset member carried on the upper portion of the forward side of said arm for engaging said abutment and thereby tipping the upper portion of the arm rearwardly when the subsoiler tool descends to a predetermined depth below the frame.

5. A subsoiler comprising a frame structure, a unit mounted on the frame structure having a subsoiler tool at the bottom and an arm extending upwardly therefrom, a roller carried by the frame engaging the rearward side of said arm, a hydraulic cylinder between the upper end of the said arm and the frame, an abutment on the frame forward of the arm for limiting the forward angular position of said arm relative to said roller, an offset member carried on the upper portion of the forward side of said arm for engaging said abutment and thereby tipping the upper portion of the arm rearwardly when the subsoiler tool descends to a predetermined depth below the frame, and adjustable means between the arm and the frame for limiting the descent of the subsoiler tool below the frame.

ROBERT H. FORGY.

References Cited in the file of this patent

UNITED STATES PATENTS

| Number | Name | Date |
|---|---|---|
| 220,877 | Sherman | Oct. 21, 1879 |
| 1,018,252 | McLaren | Feb. 20, 1912 |
| 1,904,666 | Sack | April 18, 1933 |
| 2,411,072 | Washburn | Nov. 12, 1946 |